United States Patent
Nadolny et al.

(10) Patent No.: US 10,339,836 B2
(45) Date of Patent: Jul. 2, 2019

(54) DEMONSTRATOR OF QUALITIES OF A SPECTACLE LENS MATERIAL

(71) Applicant: ESSILOR INTERNATIONAL (COMPAGNIE GENERALE D'OPTIQUE), Charenton le Pont (FR)

(72) Inventors: Carole Nadolny, Charenton le Pont (FR); Fabien Calandrini, Charenton le Pont (FR)

(73) Assignee: ESSILOR INTERNATIONAL, Charenton-le Pont (FR)

( * ) Notice: Subject to any disclaimer, the term of this patent is extended or adjusted under 35 U.S.C. 154(b) by 826 days.

(21) Appl. No.: 14/892,017

(22) PCT Filed: Apr. 7, 2014

(86) PCT No.: PCT/FR2014/050830
§ 371 (c)(1),
(2) Date: Nov. 18, 2015

(87) PCT Pub. No.: WO2014/188094
PCT Pub. Date: Nov. 27, 2014

(65) Prior Publication Data
US 2016/0111024 A1    Apr. 21, 2016

(30) Foreign Application Priority Data
May 23, 2013  (FR) .................... 13 54659

(51) Int. Cl.
*G09B 25/00* (2006.01)
*G09B 23/22* (2006.01)
*G01M 11/02* (2006.01)

(52) U.S. Cl.
CPC ......... *G09B 25/00* (2013.01); *G01M 11/0278* (2013.01); *G01M 11/0285* (2013.01); *G09B 23/22* (2013.01)

(58) Field of Classification Search
CPC ... G09B 25/00; G09B 23/22; G01M 11/0278; G01M 11/0285
(Continued)

(56) References Cited

U.S. PATENT DOCUMENTS 2,217,991 A    10/1940 Peck et al.
4,213,701 A *  7/1980 Lanzilloti .......... G01M 11/0235
                                                         356/124
(Continued)

FOREIGN PATENT DOCUMENTS

CN      2478138 Y        2/2002
DE   10 2007 028364 A   12/2008
(Continued)

OTHER PUBLICATIONS

International Search Report, dated Jul. 15, 2014 from corresponding PCT application.

*Primary Examiner* — Kurt Fernstrom
(74) *Attorney, Agent, or Firm* — Young & Thompson

(57) ABSTRACT

A demonstrator (1) of qualities of a spectacle lens material, includes a hollow base (10) which is open through an observation window (13), and a lens (20) which closes the observation window and includes at least one part (21) made of the spectacle lens material. The demonstrator includes at least two separate demonstration elements selected from the following list: an electrostatic element (50) that can move under the action of an electrostatic attraction; an ultraviolet mark (43) which allows the ultraviolet light to be viewed with the naked eye; and an abrasive element (30) suitable for scratching the demonstrator lens (20).

7 Claims, 1 Drawing Sheet

Figure 1:
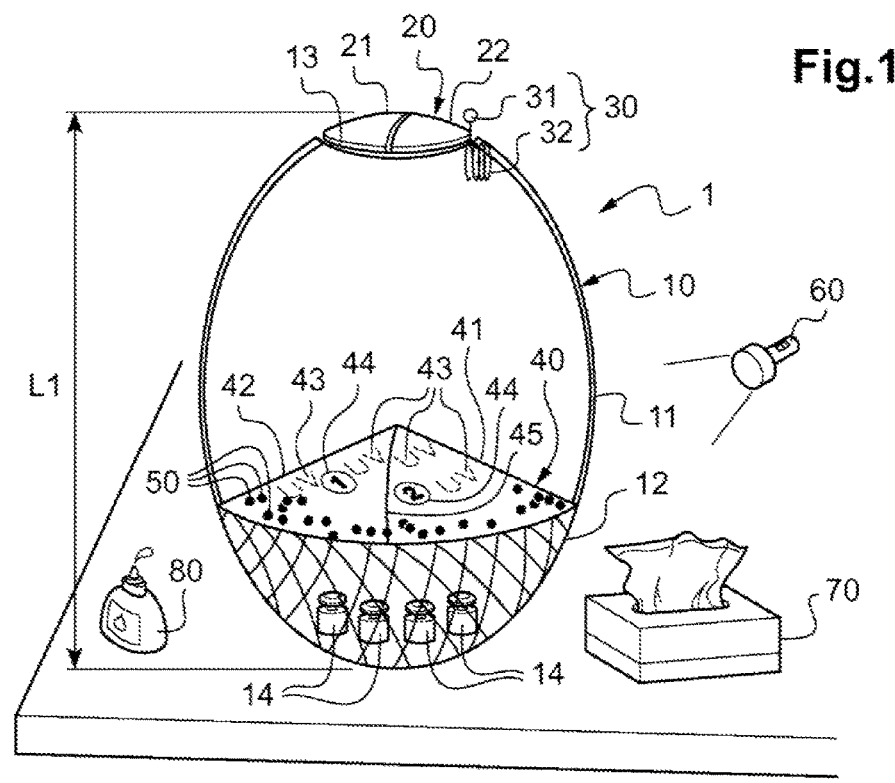

(58) Field of Classification Search
USPC ............... 434/365, 366, 367, 370, 395, 399;
351/159.01; 356/124
See application file for complete search history.

(56) References Cited

U.S. PATENT DOCUMENTS

| | | | | |
|---|---|---|---|---|
| 6,808,394 B1* | 10/2004 | Bentley | .................. | G09B 23/22 |
| | | | | 434/365 |
| 7,775,799 B2* | 8/2010 | Reiber | .................. | G09B 25/08 |
| | | | | 434/303 |
| 7,850,457 B2* | 12/2010 | Mouhot | .................. | G09B 23/22 |
| | | | | 434/301 |
| 8,379,195 B2* | 2/2013 | Cado | ..................... | G01M 11/02 |
| | | | | 356/124 |
| 8,678,834 B2* | 3/2014 | Calandrini | ......... | G01M 11/0257 |
| | | | | 351/159.01 |
| 8,960,897 B2* | 2/2015 | Nadolny | ............ | G01N 21/8422 |
| | | | | 351/159.01 |
| 2005/0157248 A1 | 7/2005 | Heisman | | |
| 2008/0272763 A1 | 11/2008 | Mouhot et al. | | |
| 2011/0069304 A1 | 3/2011 | Carole et al. | | |
| 2011/0107856 A1 | 5/2011 | Calandrini et al. | | |
| 2012/0002208 A1* | 1/2012 | Calandrini | .............. | A47F 7/021 |
| | | | | 356/448 |
| 2013/0038832 A1 | 2/2013 | Nadolny et al. | | |

FOREIGN PATENT DOCUMENTS

| | | |
|---|---|---|
| FR | 2 893 748 A1 | 5/2007 |
| FR | 2 952 464 A1 | 5/2011 |
| WO | 2009/153472 A2 | 12/2009 |
| WO | 2011/138536 A1 | 11/2011 |

* cited by examiner

DEMONSTRATOR OF QUALITIES OF A SPECTACLE LENS MATERIAL

TECHNICAL FIELD OF THE INVENTION

The present invention generally relates to the field of eyeglasses.

It more particularly relates to a demonstrator of the qualities of a spectacle eyeglass material, comprising, on the one hand, a hollow holder apertured with an observation window, and, on the other hand, a lens that closes said observation window and that comprises a portion made from said spectacle eyeglass material.

It also relates to methods for using such a demonstrator, allowing the quality of a spectacle eyeglass material to be visually proved by comparison with another spectacle eyeglass material.

PRIOR ART

Generally, a spectacle eyeglass, whether it is mineral or organic, undergoes treatments intended to improve its technical properties.

Such a spectacle eyeglass may thus receive:
- an anti-smudge treatment intended to attenuate traces left by the fingers of the user on the spectacle eyeglass;
- an antistatic treatment intended to decrease the amount of dust particles that adhere to the spectacle eyeglass electrostatically;
- a hydrophobic treatment intended to decrease fogging of the spectacle eyeglass and to allow raindrops to bead and run off the spectacle eyeglass more rapidly;
- an antireflection treatment intended to decrease reflections that disrupt the vision of the spectacle wearer;
- an anti-abrasion treatment intended to increase the durability of the spectacle eyeglass; and
- an anti-ultraviolet treatment intended to filter ultraviolet light that is harmful to the eyes of the spectacle wearer.

In order to allow an optician or a purchaser of a pair of spectacles to appreciate the antistatic properties of a spectacle eyeglass material, a demonstrator taking the form of a transparent box that contains two apertures and that houses expanded polystyrene beads is known from document FR 2 893 748. Two lenses having different antistatic properties are placed in the two apertures of the box.

Thus, this demonstrator allows, when it is shaken, the number of beads that adhere to each of the lenses to be observed and therefore the antistatic properties of these two lenses to be compared.

The major drawback of this demonstrator is that it allows only a single of the properties of the spectacle eyeglass material to be observed (here its antistatic properties).

The optician is thus forced to acquire other demonstrators in order to allow the purchaser of a pair of spectacles to see demonstrated other properties of the spectacle eyeglass material.

SUBJECT OF THE INVENTION

In order to remedy the aforementioned drawback of the prior art, the present invention proposes a demonstrator such as defined in the introduction, in which provision is made for at least two distinct demonstrating means chosen from the following list:
- an electrostatic element that is freely housed in the hollow holder and that is capable of moving under the action of an attractive electrostatic force;
- an ultraviolet mark that is located in the hollow holder so as to be observable through said lens and that appears when it is illuminated with ultraviolet light; and
- an abrasive element that is movably mounted on the hollow holder and that is suitable for scratching said lens.

Thus, by virtue of the invention, the demonstrator allows the future purchaser of a pair of spectacles to observe a plurality of properties of the spectacle eyeglass material, via one and the same single observation window, this proving to be more ergonomic.

Furthermore, the amount the optician has to spend to purchase the demonstrator is decreased.

The following are other advantageous and nonlimiting characteristics of the demonstrator according to the invention:
- said lens has two distinct portions made from two different spectacle eyeglass materials, respectively;
- said observation window is circular in shape and the two portions of the lens are formed from two half spectacle eyeglasses that are joined together;
- said hollow holder is at least partially made of a transparent material;
- the hollow holder has an ovoid shape, with an end in which said observation window is located and an opposite end that is ballasted;
- the demonstrator has a largest dimension smaller than 75 cm and a weight lower than 10 kg, in order to be transportable; and
- provision is made for a plurality of electrostatic elements each comprising an ultraviolet mark.

The invention also proposes methods for using such a demonstrator, comprising operations consisting in:
- orienting the demonstrator in such a way that the electrostatic elements are distributed over each portion of the lens; righting the demonstrator; observing to which of the two portions of the lens the largest number of electrostatic elements adhere; and deducing therefrom which of the two portions of the lens has the highest-performing anti-ultraviolet treatment;
- illuminating said ultraviolet mark by means of an ultraviolet light source; observing said ultraviolet mark through each of the two portions of the lens; and deducing therefrom which of the two portions of the lens has the highest-performing anti-ultraviolet treatment;
- passing said abrasive element over each of the portions of the lens; observing which of the two portions of the lens is the most visibly scratched; and deducing therefrom which of the two portions of the lens has the highest-performing anti-abrasion treatment;
- placing a droplet of liquid on each of the portions of the lens; observing over which of the two portions of the lens said droplet slides most rapidly; and deducing therefrom which of the two portions of the lens has the highest-performing hydrophobic treatment;
- placing a fingerprint on each of the portions of the lens; observing on which of the two portions of the lens the finger left the most visible print; and deducing therefrom which of the two portions of the lens has the highest-performing anti-smudge treatment; and
- positioning the demonstrator on a dark sheet on which an ultraviolet mark is provided, in such a way that the lens is turned toward this dark sheet; illuminating said lens by means of an ultraviolet light source; observing reflections of said ultraviolet mark from each of the two portions of the lens; and deducing therefrom which of the two portions of the lens has the highest-performing anti-ultraviolet treatment.

DETAILED DESCRIPTION OF ONE EXAMPLE EMBODIMENT

The following description, given with regard to the appended drawings and by way of nonlimiting example, will allow the invention and how it may be implemented to be easily understood.

Figure 2:
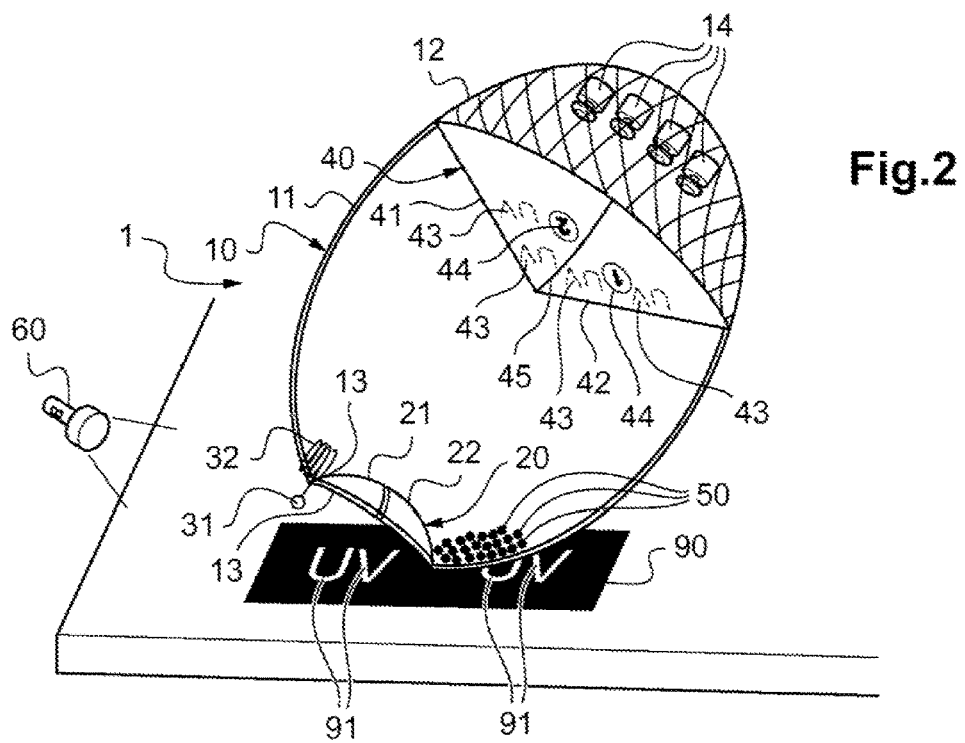

In the appended drawings:

FIG. 1 is a schematic perspective view of a demonstrator according to the invention; and FIG. 2 is a schematic perspective view of a variant embodiment of the demonstrator in FIG. 1.

By way of preliminary remark, a spectacle eyeglass is defined as being a transparent eyeglass suitable for being fitted in a spectacle frame. It may especially be a question of an ophthalmic spectacle eyeglass or an eyeglass of a pair of sunglasses.

Generally, a spectacle eyeglass comprises a mineral or organic substrate that undergoes treatments intended to improve its technical properties.

These treatments serve to improve the mechanical properties of the substrate and/or to deposit a suitable coating on this substrate.

A spectacle eyeglass may thus receive one and/or other of the following treatments:

an anti-smudge treatment intended to attenuate traces left by the fingers of the user on the spectacle eyeglass;

an antistatic treatment intended to decrease the amount of dust particles that adhere to the spectacle eyeglass electrostatically;

a hydrophobic treatment (also called a "water repellent" or "anti-rain" treatment) intended to decrease fogging of the spectacle eyeglass and to allow raindrops to bead and run off the spectacle eyeglass more rapidly;

an antireflection treatment intended to decrease reflections that disrupt the vision of the spectacle wearer;

an anti-abrasion treatment intended to increase the durability of the spectacle eyeglass; and an anti-ultraviolet treatment intended to filter ultraviolet light that is harmful to the eyes of the spectacle wearer.

Here, the case of a spectacle eyeglass having received all of these treatments will be considered.

Thus, the present invention relates to a demonstrator allowing the effectiveness of at least two of these treatments to be made visible to the naked eye.

As FIG. 1 shows, this demonstrator 1 comprises a hollow holder 10 apertured with an observation window 13. It also comprises a lens 20 that is fastened in said observation window 13 and that comprises at least one transparent portion 21 made from the same material as the spectacle eyeglass in question.

The user of this demonstrator 1 may thus look into the interior of the hollow holder 10, through the portion 21 of the lens 20.

In the rest of the description, the terms "front" and "back" will be used relative to the direction of the gaze of the user through this lens 20. The front of an element will thus designate the side of this element that is turned toward the user and the back will designate the opposite side of this element.

According to one particularly advantageous feature of the invention, the demonstrator 1 comprises at least two distinct demonstrating means chosen from the following list:

an electrostatic element 50 that is freely housed in the hollow holder 10 and that is capable of moving under the action of an electrostatic attraction;

an ultraviolet mark 43 that is located in the hollow holder 10 so as to be observable through said lens 20 and that allows an illumination with ultraviolet light to be revealed to the naked eye; and an abrasive element 30 that is movably mounted on the hollow holder 10 and that is suitable for scratching said lens 20.

In the present case, the demonstrator 1 comprises the three aforementioned demonstrating means. It thus makes it possible to see, with the naked eye, the effectiveness of all of the treatments of the material of the spectacle eyeglass in question.

As is clearly shown in FIG. 1, the hollow holder 10 here has an ovoid shape, with a front end in which said observation window 13 is located and a back end that is ballasted.

The observation window 13 is circular in shape and is centered on the front end of the hollow holder 10.

The ballast 14 for its part consists of a load or a weight, for example made of lead or a curable resin, fastened to the interior of the hollow holder 10. Thus, the hollow holder 10 behaves like a Weeble® that allows the observation window 13 to automatically return to the top.

This hollow holder 10 here consists of a body 11 that is made of a transparent material, here of plastic, and of a flexible layer 12 that covers the back end of the body 11 and that here is made of silicone. This flexible layer 12 allows the body 11 to be protected from shocks and to hide the ballast 14 attractively.

The lens 20, which closes the observation window 13, is here entirely transparent.

Here it consists of two distinct portions 21, 22, one portion 21 of which is made from the material of the spectacle eyeglass in question, and one portion 22 of which is made of another material.

These two materials will for example possibly correspond to two different generations of spectacle eyeglass materials.

As FIG. 1 shows, the two portions 21, 22 of the lens 20 are formed from two half spectacle eyeglasses that are joined together.

The lens 20 is thus obtained by cutting two initially circular spectacle eyeglasses having identical geometric characteristics, then by adhesively bonding these two half spectacle eyeglasses via their cut edge faces.

The lens 20 here has a diameter identical to that of the observation window 13 and is designed so that its convex front face or its concave back face lies in the extension of the external face of the hollow holder 10.

Here, the hollow holder 10 comprises internally a screen 40 that makes it possible to hide the ballast 14 attractively when the user of the demonstrator 1 looks inside the hollow holder 10, through the lens 20.

This screen 40 has an axisymmetric cone shape, the circular base of which is fastened to the internal face of the body 11 of the hollow holder 10, level with the front edge of the flexible layer 12, and the apex of which is oriented frontward.

The shape of the cone thus makes it possible to distribute the electrostatic elements 50 around the periphery of the screen 40, ensuring the latter is visible and readable.

The screen 40 is here made of a single piece of Bristol paper that is white in color.

It has various inscriptions 43, 44, 45 on its front face.

A first inscription, printed in black ink, forms a separating line 45 that passes through the apex of the cone and that separates the front face of the screen 40 into two equal portions 41, 42.

This separating line 45 is oriented in the same way as the edge joining the two portions 21, 22 of the lens 20. In this way, when he looks into the hollow holder 10, the user sees each portion 41, 42 of the screen 40 through each portion 21, 22 of the lens 20.

Each portion 41, 42 of the screen 40 is thus said to be associated with one portion 21, 22 of the lens 20.

The second inscriptions 44, printed in black ink on the screen 40, on either side of the separating line 45, are references that allow the two portions 41, 42 of the screen 40 to be distinguished. Here, these references are formed by the numbers "1" and "2". In practice, these references will rather be formed by the names of the materials of the spectacle eyeglasses used to produce the two portions 21, 22 of the lens 20.

Thus, each portion 41, 42 of the screen 40 will bear the name of the material used to produce the portion 21, 22 of the lens 20 with which it is associated.

The third inscriptions, printed in ultraviolet ink on the screen 40, are here formed from a plurality of pairs of letters "UV". These third inscriptions correspond to the aforementioned ultraviolet marks 43. They are distributed over the screen 40, on either side of the separating line 41.

The expression "ultraviolet ink" is understood to mean a dye that is invisible to the naked eye but that is revealed when illuminated by an ultraviolet light source of wavelength comprised between 230 and 380 nm.

As will be described below, these ultraviolet marks 43 will make it possible to determine which of the two portions 21, 22 of the lens 20 better filters ultraviolet light which, as is well known, is harmful to human eyes.

Here, as FIG. 1 shows, more than three electrostatic elements 50 are provided. In practice, provision is made here for at least about twenty thereof.

The electrostatic elements 50 must be sufficiently light to be capable of moving under the action of an attractive electrostatic force.

Many electrostatic elements 50 may be used according to the invention, provided that their electrical permittivity, their size or their density is adapted so that the electrostatic attraction exerted thereon by a nearby charged body is able to overcome gravity.

Preferably, electrostatic elements 50 are used having a relative electrical permittivity lower than 6 pF/m, preferably comprised between 0.5 and 5 pF/m, and even more preferably comprised between 1 and 4 pF/m. These permittivity values are for a temperature of 23° C. and a humidity of 50%. Again preferably, electrostatic elements 50 are used having a density lower than 150 g/L, preferably lower than 100 g/L, and even more preferably comprised between 10 and 20 g/L. The densities are measured at room temperature.

Among electrostatic elements 50 meeting the permittivity and density criteria defined above, mention may be made of airborne dust, talcum powder, small squares of tinfoil, small pieces or strands of paper, cellular particles of synthetic or natural polymers or singulated strands of synthetic or natural polymers. The aforementioned cellular polymer particles or singulated polymer strands may optionally be filled with carbon black.

The expression "cellular particles" is understood to mean particles the structure of which contain cells.

The cellular polymer particles are preferably chosen from foams and beads of expanded polymers, preferably from foams and beads of expanded polymers of polyethylene, polyvinyl chloride, polystyrene, acrylonitrile butadiene styrene (ABS), polyurethane or mixtures thereof.

In the embodiment of the invention shown in FIG. 1, the electrostatic elements are spherical or almost spherical expanded polystyrene beads 50 of diameter smaller than 8 mm, preferably comprised between 0.5 and 5 mm and more preferably between 0.5 and 3 mm.

The expanded polystyrene beads 50 are white by nature. They may however be dyed so as to be more easily seen on the white screen 40. They may have their bulk or indeed just their surface dyed various colors that may optionally be fluorescent.

Here, one portion of the expanded polystyrene beads 50 is dyed black, whereas the other portion of these expanded polystyrene beads 50 is dyed with ultraviolet ink.

As will be explained below, these expanded polystyrene beads 50 will make it possible to determine which of the two portions 21, 22 of the lens 20 has the best antistatic treatment.

The abrasive element 30, which is movably mounted on the hollow holder 10 so as to be able to scratch the lens 20, here comprises a spring 32 and a maneuvering rod 31.

The spring 32 is located inside the hollow holder 10, bearing against the internal face of the lens 20.

The maneuvering rod 31 is fastened via its back end to the spring 32. It protrudes to the front of the lens 20, through a groove that is arranged in the hollow holder 10 and that partially extends alongside the edge of the lens 20.

The user of the demonstrator 1 may thus manipulate the maneuvering rod 31 so as to make the spring 32 slide against the internal faces of the two portions 21, 22 of the lens 20.

As will be explained below, this abrasive element 30 will make it possible to determine which of the two portions 21, 22 of the lens 20 is the least prone to scratching.

As FIG. 1 shows, the demonstrator 1 has a largest dimension L1 smaller than 75 cm (here equal to about 20 cm) and a weight lower than 10 kg (here equal to about 500 g) so as to be easily transportable.

This demonstrator 1 is preferably delivered and used with various accessories 60, 70, 80.

It is especially delivered with a bottle 80 containing a liquid allowing the hydrophobic properties of the two portions 21, 22 of the lens 20 to be compared. Here, this bottle 80 contains water.

It is also delivered with a stock of sheets 70 suitable for wiping the lens 20. This stock of sheets 70 may for example consist of a packet of cloth or paper wipes.

The demonstrator 1 is lastly delivered with an ultraviolet light source.

Many suitable sources of ultraviolet light are commercially available. Here, it is a question of a key-ring UV torch.

The demonstrator 1 will then possibly be used in the following way.

In a first step, the user will possibly seek to compare the anti-smudge properties of the two portions 21, 22 of the lens 20.

To do this, he will place a fingerprint on each of the portions 21, 22 of the lens 20 and he will observe on which of the two portions 21, 22 of the lens his finger has left the least visible print. This portion 21, 22 of the lens 20 will be the portion that has the highest-performing anti-smudge treatment.

He will then possibly take a wipe in order to clean the lens 20. He will then observe that the portion of the lens 20 having the highest-performing anti-smudge treatment will be the portion that cleans most easily.

Merely cleaning the lens 20 will have the effect of creating static electricity in each of the portions 21, 22 of this lens 20, in a greater or lesser amount depending on the antistatic treatment used.

Then, in a second step, the user will possibly seek to compare the antistatic properties of the two portions 21, 22 of the lens 20.

To do this, he will turn the demonstrator 1 upside down in such a way that the expanded polystyrene beads 50 are distributed over each portion 21, 22 of the lens 20, then he will return the demonstrator 1 to its initial position. He will then observe to which of the two portions 21, 22 of the lens 20 the smallest number of expanded polystyrene beads 50 remain stuck, this portion 21, 22 of the lens 20 being the portion that has the highest-performing antistatic treatment.

In a third step, the user will possibly seek to compare the hydrophobic properties of the two portions 21, 22 of the lens 20.

To do this, he will place, using the bottle 80, a droplet of water on each of the portions 21, 22 of the lens 20, he will incline the demonstrator 1 by about 45 degrees, and he will observe over which of the two portions 21, 22 of the lens 20 said droplet runs most rapidly, while leaving the smallest trace. This portion 21, 22 of the lens 20 will be the portion that has the highest-performing hydrophobic treatment.

He will then possibly take a wipe in order to clean the lens 20.

In a fourth step, the user will possibly seek to compare the antireflection properties of the two portions 21, 22 of the lens 20.

To do this, he will look through the two portions 21, 22 of the lens 20, toward the bottom of the hollow holder 10, and he will compare how easy it is to read the second inscriptions 42 provided on the screen 40 (despite the reflections). The portion 21, 22 of the lens 20 through which it is easiest to read the second inscriptions 42 will correspond to the portion that has the highest-performing antireflection treatment.

In a fifth step, the user will possibly seek to compare the anti-abrasion properties of the two portions 21, 22 of the lens 20.

To do this, he will pass the abrasive element 30 over each of the portions 21, 22 of the lens 20 and he will observe which of the two portions 21, 22 of the lens 20 is least visibly scratched. This portion 21, 22 of the lens 20 will be the portion that has the highest-performing anti-abrasion treatment.

In a sixth and final step, the user will possibly seek to compare the anti-ultraviolet properties of the two portions 21, 22 of the lens 20.

To do this, he will illuminate with the UV torch 60 the ultraviolet marks 43 and the expanded polystyrene beads 50 through one then the other of the two portions 21, 22 of the lens 20. He will then observe that the ultraviolet marks 43 and the expanded polystyrene beads 50 are less visible when they are illuminated through a first of the two portions 21, 22 of the lens 20 relative to when they are illuminated through the other portion 21, 22 of the lens 20. This first portion 21, 22 of the lens 20 will be the portion that has the highest-performing anti-ultraviolet treatment.

The present invention is in no way limited to the embodiment described and illustrated and those skilled in the art will be able to produce variants thereof in accordance with its spirit.

For example, provision will possibly be made to place a camera above the lens of the demonstrator, so as to be able to display on an ad hoc screen the investigations carried out in the six aforementioned steps. Thus, a larger number of people will be able to observe the results of these investigations.

Provision will also possibly be made for a counter allowing the number of times the demonstrator has been used to be counted, so that the user can check that the material of the spectacle eyeglass in question resists aging well.

According to another variant, provision will possibly be made to replace the white Bristol sheet with a sheet of paper that contains optical brighteners. Such brighteners, which are compounds that are well known to those skilled in the art, emit visible light by fluorescence when they are illuminated with UV radiation. The visible light that is produced by these compounds is therefore at least partially located in the wavelength interval comprised between 380 nm and 780 nm and especially in the range, corresponding to a blue color, between 380 nm and 420 nm.

Again as a variant, the ultraviolet light source will possibly be integrated directly into the interior of the hollow holder, a switch being provided on the exterior of the latter in this case.

According to other variants (not shown) of the demonstrator, it is possible to envision the hollow holder being made from a translucent or opaque material. It is also possible to envision the hollow holder having a parallelepipedal or even spherical shape.

It is also possible to envision the lens being formed from three or more different materials. The lens will possibly also be formed from one and the same material, in which case it will not be possible to compare the properties of two different materials.

Moreover it is also possible to envision, as may be seen in FIG. 2, placing the lens 20 flipped relative to its position illustrated in FIG. 1, in such a way that its concave back face is oriented frontward.

In this variant, the anti-ultraviolet properties of the two portions of the lens will possibly be determined using a different method from the one described above.

To do this, a sheet of paper 90 of dark color, for example black, will be used, on which inscriptions 91 printed in the ultraviolet ink will have been provided.

Then, the user will turn the demonstrator 1 upside down in such a way that its lens 20 is turned toward the sheet of paper 90, the demonstrator then being held in a position in which it is inclined between 30 and 45 degrees relative to the vertical.

The user will then illuminate the lens 20 with the UV torch 60. He will thus observe that the reflections of the inscriptions 91 from the lens 20 are less visible in one of the two portions 21, 22 of the lens 20. This portion 21, 22 of the lens 20 will be the portion that has the highest-performing anti-ultraviolet treatment.

The invention claimed is:

1. A demonstrator of properties of a spectacle eyeglass material, comprising:
    a hollow holder apertured with an observation window; and
    a lens that closes said observation window and that comprises at least one portion made from said spectacle eyeglass material;
    wherein the demonstrator comprises at least two distinct demonstrating means chosen from the following list:

an electrostatic element that is freely housed in the hollow holder and that is capable of moving under the action of an electrostatic force;

an ultraviolet mark that is located in the hollow holder so as to be observable through said lens and that appears when it is illuminated with ultraviolet light; and an abrasive element that is movably mounted on the hollow holder and that is suitable for scratching said lens.

2. The demonstrator as claimed in claim 1, in which said lens has two distinct portions made from two different spectacle eyeglass materials, respectively.

3. The demonstrator as claimed in claim 2, in which said observation window is circular in shape and in which the two portions of the lens are formed from two half spectacle eyeglasses that are joined together.

4. The demonstrator as claimed in claim 1, in which said hollow holder is at least partially made of a transparent material.

5. The demonstrator as claimed in claim 1, in which the hollow holder has an ovoid shape, with an end in which said observation window is located and an opposite end that is ballasted.

6. The demonstrator as claimed in claim 1, which has a largest dimension smaller than 75 cm and a weight lower than 10 kg, in order to be transportable.

7. The demonstrator as claimed in claim 1, in which provision is made for a plurality of electrostatic elements each comprising an ultraviolet mark.

\* \* \* \* \*